(12) United States Patent
Cheng et al.

(10) Patent No.: US 10,491,974 B2
(45) Date of Patent: Nov. 26, 2019

(54) BUFFER SCHEDULING METHOD FOR FLOW SWITCHING

(71) Applicant: CHUNGHWA TELECOM CO., LTD., Taoyuan (TW)

(72) Inventors: Yuh-Jiuh Cheng, Taoyuan (TW); Yhi Shiau, Taoyuan (TW); Bor-Tauo Chen, Taoyuan (TW)

(73) Assignee: CHUNGHWA TELECOM CO., LTD., Taoyuan (TW)

( * ) Notice: Subject to any disclaimer, the term of this patent is extended or adjusted under 35 U.S.C. 154(b) by 0 days.

(21) Appl. No.: 16/154,796

(22) Filed: Oct. 9, 2018

(65) Prior Publication Data

US 2019/0200105 A1 Jun. 27, 2019

(30) Foreign Application Priority Data

Dec. 25, 2017 (TW) ................. 106145524

(51) Int. Cl.
*H04Q 11/00* (2006.01)
*H04L 12/46* (2006.01)
*H04L 12/863* (2013.01)
*H04L 12/813* (2013.01)
*H04L 12/805* (2013.01)
*H04L 12/859* (2013.01)
*H04B 10/40* (2013.01)
*H04B 10/50* (2013.01)
*H04B 10/60* (2013.01)

(52) U.S. Cl.
CPC ..... *H04Q 11/0066* (2013.01); *H04L 12/4641* (2013.01); *H04L 47/20* (2013.01); *H04L 47/2475* (2013.01); *H04L 47/36* (2013.01); *H04L 47/6255* (2013.01); *H04Q 11/0005* (2013.01); *H04B 10/40* (2013.01); *H04B 10/50* (2013.01); *H04B 10/60* (2013.01); *H04Q 2011/005* (2013.01); *H04Q 2011/0083* (2013.01); *H04Q 2213/05* (2013.01)

(58) Field of Classification Search
None
See application file for complete search history.

(56) References Cited

U.S. PATENT DOCUMENTS

2011/0268435 A1\* 11/2011 Mizutani ................. H04L 45/22
398/5
2014/0205292 A1\* 7/2014 Mori ................. H04Q 11/0005
398/54

\* cited by examiner

*Primary Examiner* — Darren E Wolf
(74) *Attorney, Agent, or Firm* — Amin, Turocy & Watson LLP

(57) ABSTRACT

A buffer scheduling method is provided for use in an Internet data center in which flows are transmitted in a "Hybrid Switching Mode" using both an optical circuit switch and an electrical circuit switch or in an "All-optical Switching Mode" using only the optical circuit switch, to improve the overall switch throughput. In the "Hybrid Switching Mode," an offloading scheme can be used; in the "All-optical Switching Mode," a discard scheme, a padding scheme, a free-riding scheme, an aggregate scheme or a smart scheme can be used. During the transitioning stage of the technology, the offloading scheme can be used in the "Hybrid Switching Mode" to achieve significant improvement in the overall switching efficiency, whereas in the all-optical switching field, the free-riding scheme, the aggregate scheme and the smart scheme can be used to achieve good switching efficiency in the "All-optical Switching Mode."

9 Claims, 3 Drawing Sheets

BUFFER SCHEDULING METHOD FOR FLOW SWITCHING

BACKGROUND

1. Technical Field

The present invention relates to a buffer scheduling method for a hybrid of an optical circuit switch and an electrical circuit switch on an Internet data center.

2. Description of Related Art

TW Patent No. 1552536 (the counterpart of US 2016/0277816), titled "Optical Data Center Network System and Optical Switch," describes an optical data center network system and an optical switch, wherein the optical switch is implemented using a commercially available Wavelength Selective Switch (WSS), and the optical data center network system is realized in three tiers, including multiple tier-1 optical switches, multiple tier-2 optical switches and multiple tier-3 optical switches. A pod is formed by the tier-1 optical switches connected to each other through ribbon fibers. A macro pod is formed by the tier-2 optical switches connected to each other through ribbon fibers, and each of the tier-2 optical switches is connected to all of the tier-1 optical switches in a corresponding pod. The tier-3 optical switches are also connected to each other through ribbon fibers, and each of the tier-3 optical switches is connected to all of the tier-2 optical switches in a corresponding macro pod. A three-tiered pyramid architecture is achieved for optical Internet data center network system.

US 2014/0205292, titled "Optical Packet Switching System" originally assigned to Fujitsu Telecom Networks, proposes an optical buffer that adopts the configuration of a standard fiber delay line, which merely performs long optical delay times, but lacks a smart way of scheduling the traffic flows. Neither does it offer a solution to the particular requirements of optical buffers on optical circuit switches.

Therefore, through diligent research and experiments the inventors have finally come up with a smart scheduling mechanism for optical buffers at the front ends of optical circuit switches to address the aforementioned shortcomings in the prior-art systems and methods.

SUMMARY OF THE INVENTION

A buffer scheduling method is provided herein for a hybrid of an optical circuit switch and an electrical circuit switch on an Internet data center. When data is transmitted in a "Hybrid Switching Mode" using both the optical circuit switch and the electrical circuit switch on the Internet data centers or in an "All-optical Switching Mode" using only the optical circuit switch, the smart buffer scheduling method can be used to effectively improve the overall switch throughput.

In an embodiment, a buffer scheduling method for flow switching is provided, which includes: defining types of flows to be transmitted by a server, wherein a flow greater than a predetermined flow size is defined as an elephant flow to be transmitted by a first VLAN port of the server, and a flow less than or equal to the predetermined flow size is defined as a mice flow to be transmitted by a second VLAN port of the server; and transmitting, by a switch connected to the server, an application packet of the elephant flow to an optical circuit switch, and handling, by the switch, an application packet of the mice flow based on a predetermined policy.

In an embodiment, the predetermined policy includes transmitting the application packet of the elephant flow to the optical circuit switch while blocking the transmission of the application packet of the mice flow.

In an embodiment, the predetermined policy includes transmitting the application packet of the elephant flow to the optical circuit switch and transmitting the application packet of the mice flow to an electrical circuit switch.

In an embodiment, the predetermined policy includes loading the mice flow into an application packet of a predetermined transmission size for transmission.

In an embodiment, the predetermined transmission size is the upper bound of the mice flow.

In an embodiment, the predetermined policy includes simultaneously transmitting a plurality of mice flows within a unit time required for transmitting the predetermined transmission size of the application packet.

In an embodiment, the predetermined policy includes loading mice flows into the application packet and transmitting the application packet once the size of the application packet is greater than or equal to the predetermined transmission size.

In an embodiment, the predetermined policy includes transmitting with priority a mice flow which is configured to have high priority within a unit time required for transmitting the predetermined transmission size of the application packet.

In an embodiment, the predetermined policy includes loading mice flows into the application packet and transmitting the application packet once a waiting threshold time is reached.

In the all-optical switching field, a buffer scheduling method for a hybrid of an optical circuit switch and an electrical circuit switch is a revolutionary topic in the applications in Internet data centers (IDC). The buffer scheduling method according to the present invention improves the overall system switching throughput and also conserves more energy.

With the buffer scheduling method for a hybrid of optical circuit switches and electrical circuit switches in IDCs, regardless of whether flows are transmitted in the "Hybrid Switching Mode" or the "All-optical Switching Mode," the smart buffer scheduling method according to the present invention can be used to effectively improve the overall switch throughput and switching efficiency and strengthen its architecture design.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE EMBODIMENTS

A buffer scheduling method is provided herein for a hybrid of an optical circuit switch and an electrical circuit switch on an Internet data center. When data is transmitted in a "Hybrid Switching Mode" using both the optical circuit switch and the electrical circuit switch on the Internet data centers or in an "All-optical Switching Mode" using only the optical circuit switch, the smart buffer scheduling method can be used to effectively improve the overall switch throughput.

Figure 1:
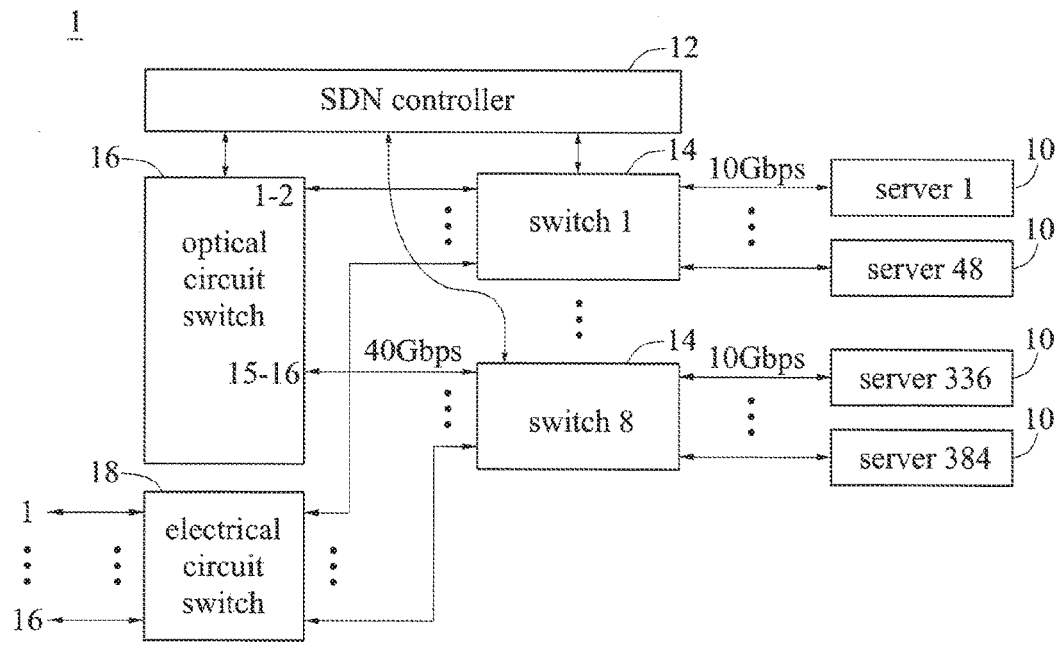
FIG. 1 is a schematic diagram illustrating the architecture of a hybrid switching system of an optical circuit switch and an electrical circuit switch in accordance with the present invention.
Figure 2:
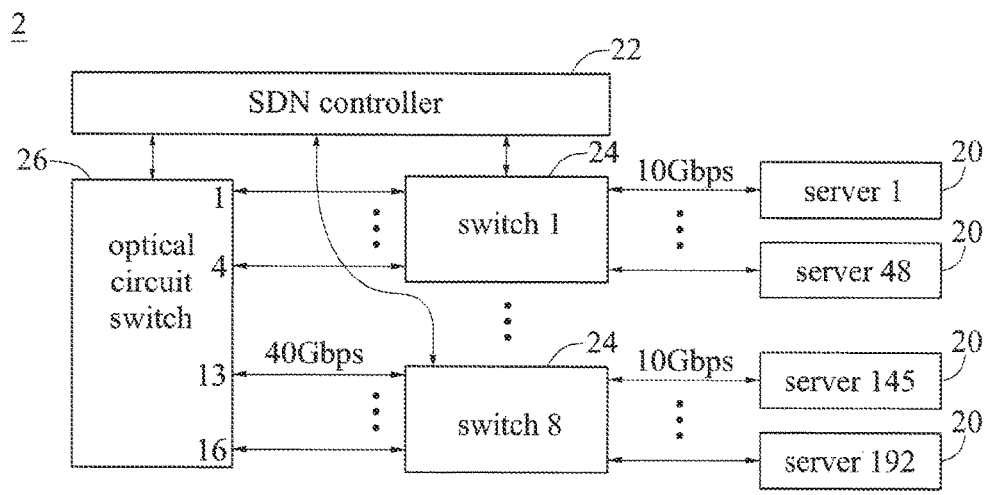
FIG. 2 is a schematic diagram illustrating the architecture of an all-optical switching system adopting an optical circuit switch in accordance with the present invention.

As shown in FIG. 1, in a hybrid switching system 1 an offloading scheme is adopted. The hybrid switching system 1 includes servers 10, a SDN controller 12, switches 14 (such as aggregate switches), an optical circuit switch 16, and an electrical circuit switch 18. In an all-optical switching system 2, as shown in FIG. 2, a discard scheme, a padding scheme, a free-riding scheme, an aggregate scheme or a smart scheme can be used. The all-optical switching system 2 includes servers 20, a SDN controller 22, switches 24 (such as aggregate switches), and an optical circuit switch 26. During the transitioning stage of the technology, the offloading scheme in the hybrid switching mode can be used; in the all-optical switching mode in the future, the free-riding scheme, the aggregate scheme and the smart scheme can be used. In an embodiment, the SDN controller 12, 22 includes not only the functionalities of a traditional controller, but also controls and schedules the switches and the optical circuit switch using the OpenFlow protocol and the NETCONF protocol, respectively.

1. Offloading Scheme:

In the hybrid switching mode, the offloading scheme can be used (as shown in FIG. 1). The size of the traffic flow is defined first. In an embodiment, traffic flow that is less than or equal to 1.25 MB is defined as a "mice flow," whereas traffic flow that is greater than 1.25 MB is defined as an "elephant flow." A mice flow is directed towards the electrical circuit switch 18 for transmission, and an elephant flow is directed towards the optical circuit switch 16 for large-data transmission. In FIG. 1, a server 10 (e.g., server 1) includes two VLAN ports; one (e.g., VLAN ID=1) specifically used for transmitting elephant flows, i.e., transmitting packets greater than 1.25 MB, and the other one (e.g., VLAN ID=2) specifically used for transmitting mice flows, i.e., transmitting packets that are less than or equal to 1.25 MB. This server 10 is connected to a switch 14 (e.g., switch 1), which will direct traffic from different VLAN ports to different core switch based on the VLAN ID. In an embodiment, an application packet of an elephant flow with VLAN ID=1 is transmitted to the optical circuit switch 16, whereas an application packet of a mice flow with VLAN ID=2 is transmitted to the electrical circuit switch 18 for transmission.

2. Discard Scheme:

In the all-optical switching mode, the discard scheme can be used (as shown in FIG. 2). The size of the traffic flow is defined first. In an embodiment, traffic flow that is less than or equal to 1.25 MB is defined as a "mice flow," whereas traffic flow that is greater than 1.25 MB is defined as an "elephant flow." In this scheme, the mice flows are simply discarded, and the elephant flows are directed to the optical circuit switch 26 for data transmission. In FIG. 2, a server 20 (e.g., server 1) has two VLAN ports; one (e.g., VLAN ID=1) for transmitting elephant flows, i.e., transmitting packets greater than 1.25 MB, and the other one (e.g., VLAN ID=2) for transmitting mice flows, i.e., transmitting packets that are less than or equal to 1.25 MB. This server 20 is connected to a switch 24 (e.g., switch 1), which will implement different policies, such as transmission or blocking, based on the VLAN ID. In an embodiment, an application packet of an elephant flow with VLAN ID=1 is transmitted to the optical circuit switch 26, whereas an application packet of a mice flow with VLAN ID=2 is blocked and discarded.

Figure 3:
FIG. 3 is a schematic diagram illustrating a padding scheme in accordance with the present invention.

3. Padding Scheme:

In the all-optical switching mode, the padding scheme can be used (as shown in FIGS. 2 and 3). The size of the traffic flow is defined first. In an embodiment, traffic flow that is less than or equal to 1.25 MB is defined as a "mice flow," whereas traffic flow that is greater than 1.25 MB is defined as an "elephant flow." Furthermore, a "truck size" is defined, which equals to the upper bound of mice flows. In an embodiment, the truck size is 1.25 MB. Regardless of its size, a mice flow is directly loaded into a packet of the truck size (=1.25 MB) for transmission. As a result, mice flows will have the lowest delay time, but also poorer overall transmission throughput. The elephant flows are still directed to the optical circuit switch 26 for data transmission. In FIG. 2, the server 20 has two VLAN ports; one (e.g., VLAN ID=1) for transmitting elephant flows, i.e., transmitting packets greater than 1.25 MB, and the other one (e.g., VLAN ID=2) for transmitting mice flows, i.e., transmitting packets that are less than or equal to 1.25 MB. This server 20 is connected to the switch 24, which will direct traffic from different VLAN ports to different core switches based on the VLAN ID. For example, an application packet of an elephant flow with VLAN ID=1 is transmitted to the optical circuit switch 26, whereas an application packet of a mice flow with VLAN ID=2 is loaded into the truck size (as seen in FIG. 3) with padding and transmitted to the optical circuit switch 26 for transmission.

Figure 4:
FIG. 4 is a schematic diagram illustrating a free-riding scheme in accordance with the present invention.

4. Free-Riding Scheme:

In the all-optical switching mode, the free-riding scheme can be used (as shown in FIGS. 2 and 4). The size of the traffic flow is defined first. In an embodiment, traffic flow that is less than or equal to 1.25 MB is defined as a "mice flow," whereas traffic flow that is greater than 1.25 MB is defined as an "elephant flow." A "truck size" is similarly defined, which equals to the upper bound of mice flows. In an embodiment, the truck size is 1.25 MB. Regardless of its size, a mice flow is loaded into a packet of the truck size (=1.25 MB) for transmission. However, in this scheme, as many mice flows as possible are loaded into the packet of the truck size within the unit time required for transmitting the packet of the truck size. In other words, when a first mice flow comes in, in the remaining of a unit time for transmitting the packet of the truck size, as many other mice flows as possible are packed and sent together in the same packet to increase the overall transmission efficiency. These other mice flows are described as taking a "free ride" in the remaining time. Similar to the previous scheme, elephant flows are directed to the optical circuit switch 26 for data transmission. In FIG. 2, the server 20 has two VLAN ports; one (e.g., VLAN ID=1) for transmitting elephant flow, i.e., transmitting packets greater than 1.25 MB, and the other one (e.g., VLAN ID=2) for transmitting mice flow, i.e., transmitting packets that are less than or equal to 1.25 MB. This server 20 is connected to the switch 24, which will direct traffic from different VLAN ports to different core switches based on the VLAN ID. In an embodiment, an application packet of an elephant flow with VLAN ID=1 is transmitted to the optical circuit switch 26, whereas as many mice flows with VLAN ID=2 as possible are loaded into an application packet of the truck size within the unit time required for transmitting this packet as possible. In the unit time for transmitting a traffic flow 1 shown in FIG. 4, as many other mice flows as possible are transmitted in the same application packet, i.e., traffic flows 2 and 3 in FIG. 4 are shown as taking a free ride along with the traffic flow 1 to the optical circuit switch 26.

Figure 5:
FIG. 5 is a schematic diagram illustrating an aggregate scheme in accordance with the present invention.

5. Aggregate Scheme:

In the all-optical switching mode, the aggregate scheme can be used (as shown in FIGS. 2 and 4). The size of the traffic flow is defined first. In an embodiment, traffic flow that is less than or equal to 1.25 MB is defined as a "mice flow," whereas traffic flow that is greater than 1.25 MB is defined as an "elephant flow." A "truck size" is similarly defined, which equals to the upper bound of mice flows. In this example, the truck size is 1.25 MB. This scheme is different from the "free-riding" scheme in that free-riding scheme allows as many mice flows to be sent as possible within the unit time for transmitting a truck-size application packet, whereas the aggregate scheme will only transmit when the overall size of the mice flows reach the truck size, i.e., 1.25 MB. In other words, when a first mice flow comes in, a second, a third to an nth mice flows will be packed into the same application packet until the overall transmission size exceeds the truck size (=1.25 MB), i.e., the truck-sized application packet is fully loaded before being sent out. In this way, the transmission throughput will be the largest, but the overall delay time will also be the longest. Similar to the previous scheme, elephant flows are directed to the optical circuit switch 26 for data transmission. In FIG. 2, the server 20 has two VLAN ports; one (e.g., VLAN ID=1) for transmitting elephant flow, i.e., transmitting packets greater than 1.25 MB, and the other one (e.g., VLAN ID=2) for transmitting mice flow, i.e., transmitting packets that are less than or equal to 1.25 MB. This server 20 is connected to the switch 24, which will direct traffic from different VLAN ports to different core switches based on the VLAN ID. In an embodiment, an application packet of an elephant flow with VLAN ID=1 is transmitted to the optical circuit switch 26, whereas as many mice flows with VLAN ID=2 are loaded into the same application packet until the truck-sized application packet is fully loaded with mice flows (the overall size of the mice flows exceeds the truck size of 1.25 MB). For example, in FIG. 5, as many mice flows as possible (traffic flows 1 to K) are aggregated together until their total size exceeds the truck size of 1.25 MB before they are packed together into an application packet and sent to the optical circuit switch 26.

Figure 6:
FIG. 6 is a schematic diagram illustrating a smart scheme in accordance with a first embodiment of the present invention.
Figure 7:
FIG. 7 is a schematic diagram illustrating a smart scheme in accordance with a second embodiment of the present invention and FIG. 8 is a schematic diagram illustrating simulated comparisons of overall performance in accordance with the present invention.

6. Smart Scheme:

In the all-optical switching mode, the smart scheme can be used (as shown in FIGS. 2, 6 and 7). The size of the traffic flow is defined first. In an embodiment, traffic flow that is less than or equal to 1.25 MB is defined as a "mice flow," whereas traffic flow that is greater than 1.25 MB is defined as an "elephant flow." A "truck size" is similarly defined, which equals to the upper bound of mice flows. In an embodiment, the truck size is 1.25 MB. This scheme is a smart mutation based on both the free-riding scheme and the aggregate scheme, in which within the unit time for transmitting an application packet of the truck size, if a mice flow of high priority comes in, the entire buffered flows are transmitted immediately; in addition, a slightly different version of the previous aggregate scheme is also used, in which the time it has taken to fill the application packet of the truck size is calculated, and a waiting threshold time is predefined, for example, as 0.5 seconds, as soon as the time it has taken to fill the application packet of the truck size exceeds 0.5 seconds, the accumulated flows will be sent out regardless of whether the total size of the packet exceeds the truck size (=1.25 MB in this example). This mechanism reduces the overall delay time. Similar to the previous scheme, elephant flows are directed to the optical circuit switch 26 for data transmission. In FIG. 2, the server 20 has two VLAN ports; one (e.g., VLAN ID=1) for transmitting elephant flow, i.e., transmitting packets greater than 1.25 MB, and the other one (e.g., VLAN ID=2) for transmitting mice flow, i.e., transmitting packets that are less than or equal to 1.25 MB. This server 20 is connected to the switch 24, which will direct traffic from different VLAN ports to different core switches based on the VLAN ID. For example, an application packet of an elephant flow with VLAN ID=1 is transmitted to the optical circuit switch 26, whereas application packet of mice flows with VLAN ID=2 are transmitted according to the smart scheme, in which when a mice flow of high priority, e.g., an urgent flow N with high priority shown in FIG. 6 comes in, then the entire buffered flows 1-N immediately get transmitted; furthermore, the time it has taken the fill an application packet is compared with a predefined waiting threshold time (0.5 seconds), when this accumulated time exceeds 0.5 seconds, e.g., the accumulated time calculated up to the moment a flow M is loaded is greater than 0.5 seconds, the flows (e.g., flows 1-M) accumulated so far are then packed and sent out together.

Strategically, during the transitioning stage of the technology in which the Internet data center uses the hybrid switching mode, the offloading scheme in the smart buffer scheduling method according to the present invention can be implemented, whereas in the future all-optical switching field in which the Internet data center will adopt the all-optical switching mode, the aggregate scheme in the smart buffer scheduling method according to the present invention can be implemented due to its ease of implementation in the medium term, and the smart scheme can be implemented in the long term for it has the highest switching efficiency.

Figure 8:
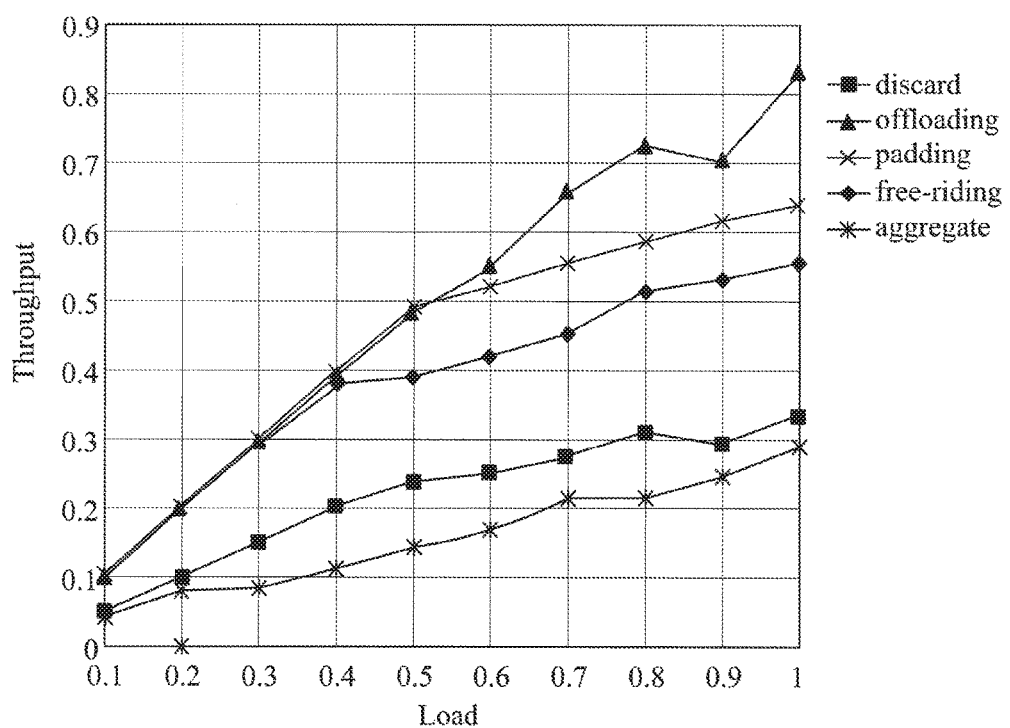

Compared to the prior art, the present invention has at least the following advantages:

1. In the hybrid switching mode, offloading scheme allows mice flows to be directed to the electrical circuit switch, while the elephant flows to be directed to the optical circuit switch for transmission of large data. This scheme offloads extremely large flows, such as elephant flows, to the electrical circuit switch of higher speed, and directs mice flows to the electrical circuit switch, thereby increasing the overall switching throughput (as shown in FIG. 8). The optical circuit switch is also more energy efficient and environmental friendly.

2. Padding Scheme:

In the all-optical switching mode, the padding scheme can be used, in which a mice flow is directly loaded into a packet of a truck size (equals to 1.25 MB) regardless of its size. This scheme has the lowest delay time for mice flows. On the other hand, the elephant flows are directed to the optical circuit switch for data transmission. The overall efficiency is as shown in FIG. 8.

3. Free-Riding Scheme:

In the all-optical switching mode, the free-riding scheme can be used, in which as many mice flows are fitted into a packet of a truck size within the unit time for transmitting the application packet of the truck size, which increases the overall transmission efficiency over the padding scheme (as shown in FIG. 8). On the other hand, the elephant flows are similarly directed to the optical circuit switch for data transmission.

4. Aggregate Scheme:

In the all-optical switching mode, the aggregate scheme can be used, in which an application packet of a truck size fully loaded with mice flows is transmitted. This scheme has the largest transmission throughput. On the other hand, the elephant flows are similarly directed to the optical circuit switch for data transmission. The overall efficiency is as shown in FIG. 8.

5. Smart Scheme:

In the all-optical switching mode, the smart scheme can be used. This scheme is a smart mutation based on the free-riding scheme and the aggregate scheme. In the unit time required for transmitting an application packet of the truck size, if a mice flow with high priority comes in, the entire buffered flows get transmitted immediately. This scheme has the slowest delay time, and the best and fastest buffer mechanism for Internet real-time applications; the aggregate scheme is also used in which the accumulated time it has taken to load the flows is calculated. As soon as the accumulated time reaches the waiting threshold time, the flows accumulated so far in the packet are sent out regardless of whether the accumulated size of the flows exceeds the truck size. This mechanism reduces the overall delay time. On the other hand, the elephant flows are similarly directed to the optical circuit switch for data transmission.

The above embodiments are used only to illustrate the principles of the present invention and its effect, rather than to limit the present invention. The above embodiments can be modified by one of ordinary skill in the art without departing from the spirit and scope of the present invention. Therefore, the scope claimed of the present invention should be defined by the following claims.

What is claimed is:

1. A buffer scheduling method for flow switching, comprising:

defining types of flows to be transmitted by a server, wherein a flow greater than a predetermined flow size is defined as an elephant flow to be transmitted by a first VLAN port of the server, and a flow less than or equal to the predetermined flow size is defined as a mice flow to be transmitted by a second VLAN port of the server; and transmitting, by a switch connected to the server, an application packet of the elephant flow to an optical circuit switch, and transmitting or blocking, by the switch, an application packet of the mice flow based on a predetermined policy, wherein the predetermined policy includes transmitting the application packet of the elephant flow to the optical circuit switch, and transmitting the application packet of the mice flow to an electrical circuit switch or the optical circuit switch or blocking the application packet of the mice flow.

2. The buffer scheduling method of claim 1, wherein the predetermined policy includes transmitting the application packet of the elephant flow to the optical circuit switch while blocking the transmission of the application packet of the mice flow.

3. The buffer scheduling method of claim 1, wherein the predetermined policy includes transmitting the application packet of the elephant flow to the optical circuit switch and transmitting the application packet of the mice flow to the electrical circuit switch.

4. The buffer scheduling method of claim 1, wherein the predetermined policy includes loading the mice flow into a new application packet of a predetermined transmission size for transmission.

5. The buffer scheduling method of claim 4, wherein the predetermined transmission size is an upper bound of the mice flow.

6. The buffer scheduling method of claim 4, wherein the predetermined policy includes simultaneously transmitting a plurality of the mice flows within a unit time required for transmitting the predetermined transmission size of the new application packet.

7. The buffer scheduling method of claim 4, wherein the predetermined policy includes loading a plurality of the mice flows into the new application packet and transmitting the new application packet once a size of the new application packet is greater than or equal to the predetermined transmission size.

8. The buffer scheduling method of claim 4, wherein the predetermined policy includes transmitting with priority the mice flow which is configured to have high priority within a unit time required for transmitting the predetermined transmission size of the new application packet.

9. The buffer scheduling method of claim 4, wherein the predetermined policy includes loading a plurality of the mice flows into the new application packet and transmitting the new application packet once a waiting threshold time is reached.

* * * * *